United States Patent
Rosenbach

(10) Patent No.: US 9,277,355 B1
(45) Date of Patent: Mar. 1, 2016

(54) CELLULAR TELEPHONE TRACKING TECHNIQUES

(71) Applicant: Philip Rosenbach, Morristown, NJ (US)

(72) Inventor: Philip Rosenbach, Morristown, NJ (US)

( * ) Notice: Subject to any disclaimer, the term of this patent is extended or adjusted under 35 U.S.C. 154(b) by 0 days.

(21) Appl. No.: 14/245,438

(22) Filed: Apr. 4, 2014

Related U.S. Application Data

(60) Provisional application No. 61/808,351, filed on Apr. 4, 2013.

(51) Int. Cl.
*H04W 24/00* (2009.01)
*H04W 4/02* (2009.01)
*H04W 88/06* (2009.01)
*H04W 64/00* (2009.01)

(52) U.S. Cl.
CPC ............... *H04W 4/02* (2013.01); *H04W 64/00* (2013.01); *H04W 64/006* (2013.01); *H04W 88/06* (2013.01)

(58) Field of Classification Search
CPC ....... H04W 4/02; H04W 88/06; H04W 64/00; H04W 64/006
See application file for complete search history.

(56) References Cited

U.S. PATENT DOCUMENTS

| | | |
|---|---|---|
| 7,801,512 B1 | 9/2010 | Myr |
| 7,881,710 B2 | 2/2011 | Keohane et al. |
| 7,953,809 B2 | 5/2011 | Lau et al. |
| 8,014,789 B2 | 9/2011 | Breed |
| 8,035,508 B2 | 10/2011 | Breed |
| 8,041,334 B2 | 10/2011 | Yoon |
| 8,176,135 B2 | 5/2012 | Lau et al. |
| 8,315,597 B2 | 11/2012 | Olincy et al. |
| 8,380,161 B2 | 2/2013 | Ewell, Jr. et al. |
| 8,384,555 B2 | 2/2013 | Rosen |
| 8,385,880 B2 | 2/2013 | Ewell, Jr. et al. |
| 8,432,275 B2 | 4/2013 | Patel et al. |
| 8,437,729 B2 | 5/2013 | Ewell, Jr. et al. |
| 8,489,063 B2 | 7/2013 | Petite |
| 2010/0210301 A1* | 8/2010 | Dietz et al. ................. 455/556.1 |
| 2013/0143527 A1 | 6/2013 | Randazzo et al. |
| 2013/0143528 A1 | 6/2013 | Randazzo et al. |
| 2013/0145007 A1* | 6/2013 | Randazzo et al. ............ 709/223 |
| 2013/0337763 A1* | 12/2013 | Shyamalan ................ 455/404.1 |
| 2014/0057610 A1* | 2/2014 | Olincy et al. ............... 455/414.1 |
| 2014/0066097 A1* | 3/2014 | Kolodziej ................... 455/456.3 |
| 2015/0172450 A1 | 6/2015 | Singhal |
| 2015/0181414 A1 | 6/2015 | Bretscher et al. |
| 2015/0195705 A1 | 7/2015 | Mullins |
| 2015/0207915 A1 | 7/2015 | Roberts et al. |

FOREIGN PATENT DOCUMENTS

| | | |
|---|---|---|
| WO | 2013056307 A2 | 8/2011 |
| WO | 2011081976 A2 | 6/2013 |

* cited by examiner

*Primary Examiner* — Khalid Shaheed
(74) *Attorney, Agent, or Firm* — Brian Roffe

(57) ABSTRACT

Communications device includes a device speed determining unit that determines a speed of movement of the communications device, and a responsive unit that analyzes the speed of movement of the communications device and determines or enable a determination of whether it is indicative of walking of a holder of the communications device or indicative of motorized transport of the holder of the communications device.

20 Claims, 2 Drawing Sheets

| Speed Condition | Message | Recipient |
|---|---|---|
| None | Arrived at School | Parent #1 |
| Less than threshold 1 | On Way Home-Walking | Parent #2 |
| Greater than threshold 1 and less than threshold 2 | On Bus | Parent #2 |
| Greater than threshold 2 | In Danger | Parent #1 |
| Greater than threshold 2 | In Danger | Parent #2 |

CELLULAR TELEPHONE TRACKING TECHNIQUES

CROSS REFERENCE TO RELATED APPLICATION

This application claims priority under 35 U.S.C. §119(e) of U.S. provisional patent application Ser. No. 61/808,351 filed Apr. 4, 2013, which is incorporated by reference herein.

FIELD OF THE INVENTION

The present invention relates generally to the field of tracking cellular telephones and other portable communication devices, and more particularly, to methods and computer hardware/software combinations that are capable of tracking location and/or use of cellular telephones and other portable communication devices.

The present invention also relates to techniques for controlling communications devices based on their speed, for example, to switch off transmission capability when determined to be on a moving airplane.

OBJECTS AND SUMMARY OF THE INVENTION

It is an object of an embodiment of the present invention to provide techniques and implementing structure that track cellular telephones and other portable communication devices.

Another object of an embodiment of the present invention is to provide methods and computer hardware/software combinations that are capable of tracking location and/or use of cellular telephones and other portable communication devices.

Another object of an embodiment of the present invention is to provide techniques for controlling communications devices based on their speed, for example, to switch off transmission capability when determined to be on a moving airplane.

A communications device in accordance with the invention includes a device speed determining unit, mechanism, system, arrangement or means that determine a speed of movement of the communications device, and a responsive unit, mechanism, system, arrangement or means that analyze the speed of movement of the communications device and determine or enable a determination of whether it is indicative of walking of a holder of the communications device or indicative of motorized transport of the holder of the communications device.

Another embodiment of a communications device that enables monitoring of presence and movement of a holder thereof in accordance with the invention includes a speed determining unit that determines a speed of movement of the communications device, an analysis unit that analyzes the speed of movement of the communications device relative to a threshold and determines that, when below the threshold, it is indicative of walking of a holder of the communications device and when above the threshold, it is indicative of motorized transport of the holder of the communications device, and a message generator that generates a message based on the determination by the analysis unit. The message generator selects one of a plurality of possible, different messages based on the speed of movement of the communications device relative to the threshold. A communications component or unit is configured to send the selected message to at least one other communications device from among a plurality of predetermined other communications devices. Each other communications device to which the selected message is sent is determined based on the speed of movement of the communications device relative to the threshold, such that both the selected message and at least one recipient thereof are determined based on the speed of movement of the communications device relative to the threshold.

The speed determining unit may include a location determining system situated or incorporated into the communications device. Analysis of multiple locations determined by the location determining system and time between obtaining of the multiple locations can be converted into speed of movement of the communications device. The analysis unit is configured to determine whether the speed of movement of the communications device is indicative of walking of the holder of the communications device or indicative of the motorized transport of the holder of the communications device based on comparison of the speed of movement to one or more thresholds.

The message generator may be configured to select a message to be sent to the at least one other communications device only when the speed of movement of the communications device is indicative of the motorized transport of the holder of the communications device. Walking would not cause a message to be generated.

A movement discriminator may be provided to consider whether movement of the communications device is indicative of public transportation. In this case, the communications unit is configured to send one of the plurality of possible, different messages to the at least one other communications device based on the speed of movement of the communications device relative to the threshold and if the movement is indicative of public transportation.

In one embodiment, the message generator includes a table associating different speed conditions to different messages. Satisfaction of one of the different speed conditions causes selection of the associated message. The table further includes contact information for the other communications devices to potentially receive the different messages. Satisfaction of one of the different speed conditions causes selection of the associated message and retrieval of the contact information for the at least one other communications devices to receive the selected message.

A computer program resident on non-transitory computer readable medium in a communications device and that enables monitoring of presence and movement of a holder of the communications device in accordance with the invention is configured to determine a speed of movement of the communications device, analyze the determined speed of movement of the communications device relative to a threshold, and determine that, when below the threshold, the determined speed of movement is indicative of walking of a holder of the communications device and when above the threshold, the determined speed of movement is indicative of motorized transport of the holder of the communications device. The computer program also selects one of a plurality of possible, different messages based on the speed of movement of the communications device relative to the threshold, and sends the selected message to at least one other communications device from among a plurality of predetermined other communications devices. Each other communications device to which the selected message is sent is determined based on the speed of movement of the communications device relative to the threshold.

The computer program is also configured to determine whether the speed of movement of the communications device is indicative of walking of the holder of the communications device or indicative of the motorized transport of the holder of the communications device based on comparison of the speed of movement to one or more thresholds, and to send the selected message to the at least one other communications device only when the speed of movement of the communications device is indicative of the motorized transport of the holder of the communications device.

The computer program may also be configured to consider whether movement of the communications device is indicative of public transportation, and if so, send one of the plurality of possible, different messages to another communications device based on the speed of movement of the communications device relative to the threshold and if the movement is indicative of public transportation.

The computer program may also be configured to store a table associating different speed conditions to different messages, such that satisfaction of one of the different speed conditions causes selection of the associated message. The table includes contact information for the other communications devices to receive the different messages. Satisfaction of one of the different speed conditions causes selection of the associated message and retrieval of the contact information for the at least one other communications device to receive the selected message.

A method for controlling communications devices on an airplane in accordance with the invention includes detecting horizontal and vertical movement of the communications device, analyzing the detected horizontal and vertical movement of the communications device relative to thresholds and determining based thereon that the communications device is present on an airplane, and then automatically switching off the functionality of communications of the communications device. The latter may entail deactivating transmission of electromagnetic waves by the communications device.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims.

DETAILED DESCRIPTION OF THE INVENTION

Referring now to the following embodiments, which may be used individually or in any combination with one another, a first embodiment of the invention is based on recognition of the fact that when a portable communications device 8, such as a Smartphone, is determined to be moving or traveling at a speed above a typical walking speed, then it will be considered that the holder or the communications device 8 is situated in a moving vehicle, such as a car. The typical walking speed may be programmed into the communications device 8. It may be empirically determined by sampling various individuals of different ages, health status, etc., or by any other manner known to those skilled in the art, and may even be obtained from existing references.

As an example, it may be considered that the typical walking speed is less than about 4 mph and the typical driving speed driving speed is generally more than about 10 mph. As such, whenever the communications device 8 provides speed-related information that can be converted into an indication of a speed below 4 mph, the holder of the communications device 8 will be considered to be walking. On the other hand, whenever the communications device 8 provides speed-related information that can be converted into an indication of a speed above 10 mph, the holder of the communications device 8 will be considered to be in a moving vehicle.

Figure 1:
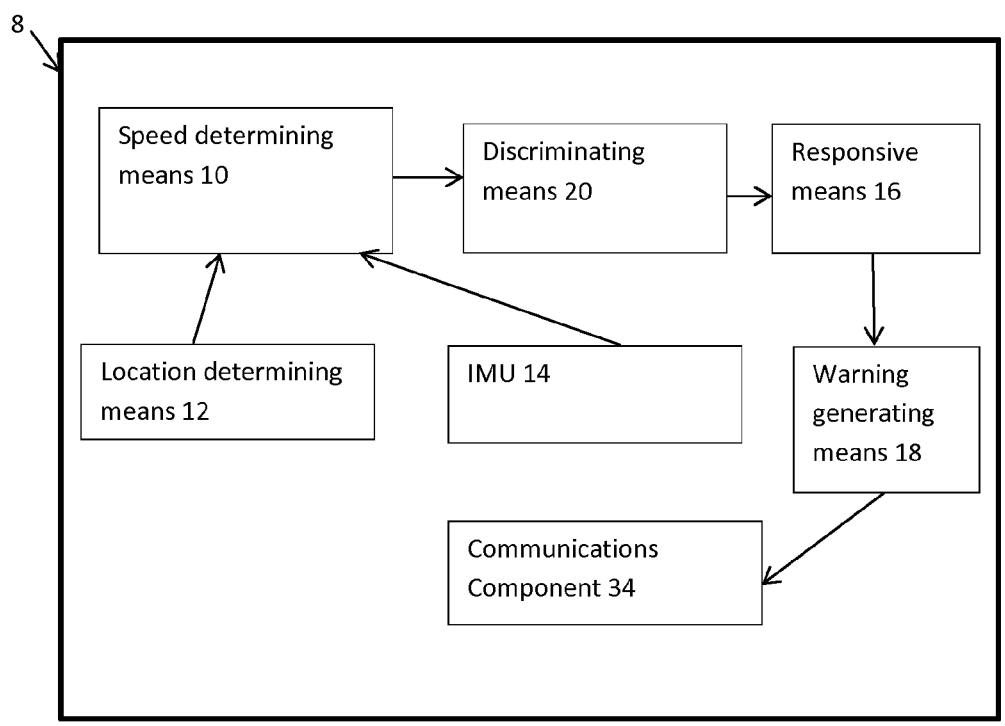
FIG. 1 is a schematic of an embodiment of the invention.
Figure 1:
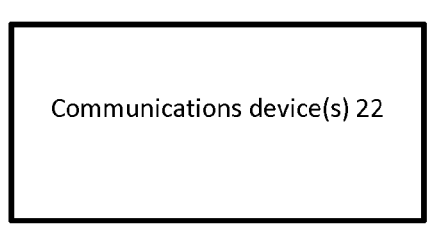

The speed of movement of the communications device 8 may be determined in a variety of different ways by appropriate hardware and/or software, referred to generally herein as a speed determining unit or speed determining means 10, in FIG. 1. One way is to use a location determining system 12, e.g., a GPS system, that is situated or incorporated into the communications device 8. Another way is to use a phone-resident inertial measurement unit (IMU) 14, which may have any of a variety of known constructions, or accelerometers.

A computer program may be designed to monitor the speed as determined by the device speed determining means 10 and respond thereto, e.g., an analysis unit or responsive means 16, possibly causing generation of a warning based thereon by a warning generator or warning generating means 18. Responsive means 16 may comprise a processor or other comparable processing unit.

The warning generating means 18 may send a message, e.g., an SMS message, to another device, for example, the communications device 22 of a child's parents if the communications device 8 being monitored is their child's device. Additional and alternative warnings are also envisioned. Thus, the warning generating means may be considered a message generator.

In one embodiment, the warning message is communicated via the communications component 34 of the communications device 8 to one or more other communications device 22. The communications device 8 may be programmed with a list of communications devices 22 to communicate with to send a message to, which list may be stored in a memory component, either on the communications device 8 itself or accessible via a communications network. Thus, once a selected warning is to be sent, the communications device 8 may access the list from the memory component and begin to call the first number on the list associated with the selected warning. Alternatively, the communications device 8 may call a plurality of numbers on the list. Thus, if a child is the holder of the communications device 8 and they are determined to be moving, the communications device 8 may initiate a communication with both parent's communications devices 22 substantially simultaneously.

Figures 2, 3:
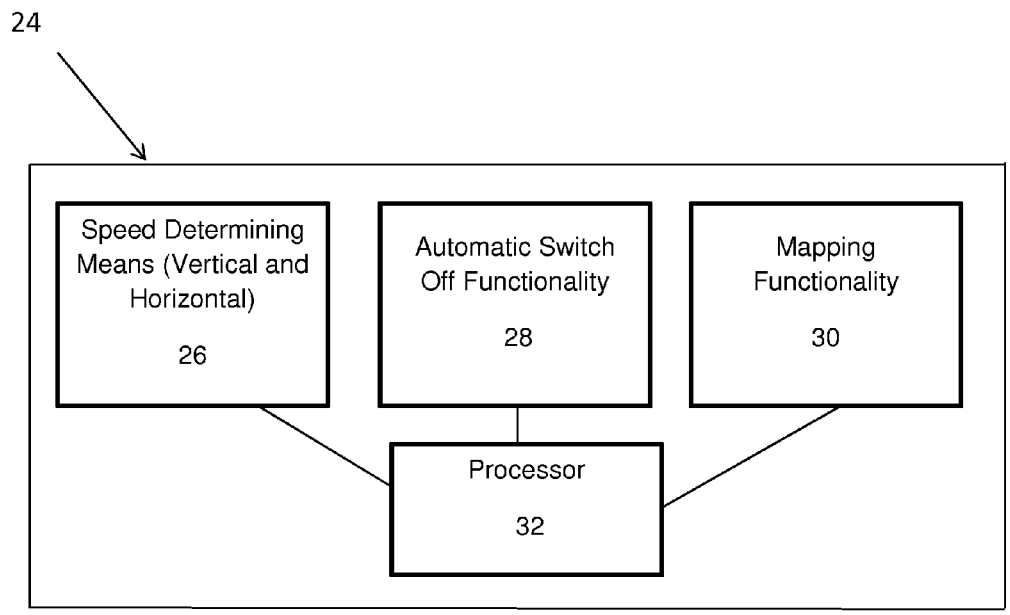
FIG. 2 is a table showing possible messages to be sent with predetermined recipients using a technique in accordance with the invention.
FIG. 3 is a schematic of another embodiment of the invention.

As shown in FIG. 2, a table may be generated by the parent that will correlate messages to be sent based on the condition of the holder of the communications device 8, i.e., the determined speed of movement of the communications device 8 relative to a speed threshold, and the destination of those messages. Thus, in one situation, if the child is determined to be walking, a "walking" message may be sent to a first group of phone numbers, while in another situation, if the child is determined to be moving in motorized transport, a "moving" message may be sent to a second group of phone numbers, which may or may not be mutually exclusive to those in the first group. This is useful because at times, the parent expects the child to be walking, so the moving message would be indicative of trouble, while at other times, the parent expects the child to be moving in motorized transport (in a carpool), so that a walking message would be indicative of a deviation and possible trouble. The parent is freely able to change the conditions for sending the specific messages, so that at one time, a warning message may be sent when the child is walking while at another time, a warning message may be sent when the child is in motorized transport.

Thus, the person setting up the communications device 8 may program it to provide one or a plurality of different messages to specific phone numbers of communications devices 22 based on the determined speed of movement of the communications device 8.

For example, with reference to FIG. 2, it is possible to program the communications device 8 to include a table in electronic form (the specific manner of building a table in electronic form being known to those skilled in the art to which this invention pertains). The table would include different speed conditions, relative to two thresholds, thresholds 1 and 2 as shown in the first column in FIG. 2, or a single threshold or more than two thresholds. Each different threshold may be associated with a specific one of a plurality of different messages relating to the speed condition. That is, a speed condition indicative of no movement may be associated with a message "arrived", coming after movement of the communications device 8. Similarly, a low speed condition may be associated with a walking message while a higher speed condition may be associated with taking a bus and an even higher speed condition associated with a danger condition, i.e., in a private vehicle. The particular thresholds and messages are at the discretion of the programmer that programs the table into the communications device 8. Although shown as text messages, the warning generating means 18 could additionally or alternatively generate voice messages, e-mail messages, and the like.

Also, the programmer provides recipients of the messages in the table. Generally, different recipients may be interested in receiving particular messages relating to speed conditions of the communications device 8 and not others, i.e., there is discrimination with respect to the recipients. For example, parent #1 may be interested in the child's journey to school since they are available to respond to an emergency, but not Parent #2, while Parent #2 may be interested in the child's journey home after school since they are available to respond to an emergency, but not Parent #1. Different recipients and different messages may be generated using the communications device 8, and/or communications device 8 may be provided with a program that receives commands from a controller, e.g., at the parents communications device 22 and is configured to respond to such comments to act in accordance with a provided table of messages and recipients.

The computer program may be designed to eliminate public transportation, e.g., buses and subways. Thus, the parent would not receive a warning of their child is on the subway or bus, or receive a message that they are on the bus if so programmed (see FIG. 2). There are several ways to accomplish this, referred to herein as discriminating means 20, which may be separated from or integrated with the responsive means 16. The discriminating means 20 are coupled to the device speed determining means 10 and consider the device speed, among other input, to output an indication that the movement corresponds to movement of a subway or bus, for example. For subways, the discriminating means 20 can use a mapping 'app' on the communications device 8 to eliminate that case, and may also be used for buses.

Another way might be to tie it to something that is on the child's car. Since most cars now have some sort of telematics receiver and/or transmitter, the communications device 8 can sense for that. Alternately, there can be something on the key fob which transmits a Bluetooth signal when the keys are in the ignition Also, there are recognizable signals emitted by the vehicle which can be trained for, e.g., through pattern recognition, so that the communications device 8 recognizes that it is in a particular vehicle. Something can also be installed on the vehicle that transmits a signal to the cell phone when the vehicle is running.

In another embodiment, the communications device 8 may be configured through hardware and/or software to know when it is near an object, such as the owner's car, by virtue of the object emitting a signal that can be sensed by the communications device 8.

In yet another embodiment, the communications device 8 would include a computer program, e.g., an 'app', that would track the use of the device, in terms of sending or opening texts, reading e-mails, and/or even doing other things that require visual attention, if the communications device 8 is moving above a certain velocity. The velocity threshold that would trigger this functionality may be determined empirically, and may be varied by the person or people monitoring the use of the communications device 8. In this case, when the device speed determining means 10 determine that the speed of movement of the communications device 8 is above the threshold, it would determine whether an e-mail application is being accessed and used, whether a text message is being opened or sent, and/or whether a game is being played.

If any of these triggering events is identified, then the app could take one or more of a variety of different actions such as sending a message to a parent (if the communications device 8 is a child's phone) which could include a location and a velocity of the communications device 8, disabling the communications device 8, and/or sending a warning to the user.

Potential markets for the 'app' include parents but beyond that, perhaps the cellular carriers themselves as a safety option and to avoid legislative threats of prohibiting the use of phones while driving.

Although the app might consider movement of communications device on public transportation, i.e., when the user is on a bus, or train, or if the user is a passenger in a vehicle, these false positives could be considered adverse side effects. It may be possible to eliminate these false positives through training, e.g., pattern recognition training, and use of maps containing known routes of buses and subways.

The various means disclosed above may be implemented using software and/or hardware and would be able to be constructed by one of ordinary skill in the art to which this invention pertains in view of the disclosure herein. Generally, the means would be implemented using one or more electronic components and a program that controls and/or configures the electronic component(s) to provide the desired functionality.

Accordingly, disclosed above is a method for monitoring of presence and movement of a holder of the communications device in which a speed of movement of the communications device is determined and analyzed relative to a threshold to determine that, when below the threshold, it is indicative of walking of a holder of the communications device and when above the threshold, it is indicative of motorized transport of the holder of the communications device. One of a plurality of possible, different messages are then directed to one or more other communications devices based on the speed of movement of the communications device relative to the threshold. Determining the speed of movement of the communications device may entail using a location determining system situated or incorporated into the communications device, and analyzing multiple locations determined by the location determining system and time between obtaining of the multiple locations. Sending one of the plurality of possible, different messages to the one or more other communications devices may entail sending a message to another, predetermined communications device only when the speed of movement of the communications device is indicative of the motorized transport of the holder of the communications device, or only when the speed of movement of the communications device is indicative of walking of the holder of the communications device.

The method may also entail considering whether movement of the communications device is indicative of public transportation, and if so, sending one of a plurality of possible, different messages to another communications device based on the speed of movement of the communications device relative to the threshold and if the movement is indicative of public transportation.

Referring now to FIG. 3, the foregoing techniques can also be used to control switching off mobile devices in airplanes.

Currently, all passengers are required to switch off communications and mobile devices during the flight, or at least such switching off is recommended. Mobile phones as well as any other devices radiating electromagnetic waves should be switched off during the entire flight and all electronic devices possessed by airplane passengers must be switched off, at least during take-off and landing. However, many passengers either forget or neglect doing this.

To effect forced switching off of mobile devices in airplanes and/or to deactivate their transmitting functions in order to prevent interferences with the on-board equipment, an embodiment of the invention may be incorporated into communications devices for automatic use on airplanes.

The speed of movement in the vertical direction can be detected by the speed determining means 26 of the communications device 24 and if it exceeds some predetermined threshold, the communications device 24 will be considered to be located inside an airplane. Variations to and modifications for the speed determining means 26 are the same as for speed determining means 10 described above.

In order to distinguish, for example, between the airplane and a high speed elevator in a skyscraper, the speed in a horizontal direction can also be measured by the speed determining means 26. If the speed in the horizontal direction is zero or close to zero while the speed in the vertical direction exceeds some threshold, this indicates that the communications device 24 is located in an elevator. If the speed in both vertical and horizontal directions exceeds some predetermined thresholds not common for ground-based vehicles, a conclusion can be made that the communications device 24 is located inside an airplane that takes off or lands. The speed determining means 26 would thus be configured to determine both vertical and horizontal movement, or acceleration.

A processor 32 in the communications device 24 would be coupled to the speed determining means 26, be programmed with the threshold, and then make the determination as to whether the communications device 24 is in an airplane, in another vehicle, in an elevator, and/or not in any vehicle or elevator.

When both horizontal and vertical movement is detected by the speed determining means 26, a forced switch off can be generated by the communications device 24 itself or transmitting of electromagnetic waves by the communications device 24 can be deactivated by disabling the transmitter, for example. This forced switch off may be implemented by a switch off functionality 28 in the communications device 24, i.e., electronic hardware and/or software that may be configured by those skilled in the art to which the invention pertains in view of the disclosure herein.

In an alternative embodiment, a mapping application 30 resident on the communications device 24 and coupled to the processor 32, can be used to detect that the communications device 24 is located on a height above the surface of the earth that exceeds some threshold approximately equal to the height of a large airplane. If, at the same time, it is detected, by the speed determining means 26, that the speed of movement in the horizontal direction also exceeds some predetermined threshold not common for ground-based vehicles, a conclusion can be made by the processor 32 receiving input from the speed determining means 26 and the mapping application 30 that the communications device 24 is located in an airplane that takes off or lands. A forced switch off of the communications device 24 can be generated in this case, by the switch off functionality 28, or its transmitting functions can be disabled. In the latter case, a warning can be indicated to the user that the transmitter of his or her communications device 24 is off and should remain off during the flight.

All modern transmitters or transceivers of communications devices support the function of switching off or disabling the transmitter. For example, it can be implemented in one or another way, for example, using the pin 'Enable' of the transceiver's or transmitter's integrated circuit, which pin is controlled by the processor 32, or through a particular communication interface with the processor 32 such 12C, SPI or any other. Thus, implementation of such control function in the communications device 24 does not represent any essential efforts from the development point of view and in most cases it can be done by a program running on the processor 32 of the communications device 24 without any changes to the hardware design.

The option to disable the transmitter of the communications device 24, instead of complete switching off, has the advantage that the passengers are not prevented from reading books on electronic devices, playing games, watching movies, using camera, etc. Since the rules still prescribe complete switching off of the mobile electronic devices, the implementation of this option may still be preferable at the moment. However, possible revision of these rules might be expected in the near future, since the level of parasitic electromagnetic emissions of electronic devices has become much smaller since the time when current air transportation rules have been accepted.

When only the transmitter of the communications device 24 was switched off but other electronic circuitries remain functioning, it is possible to detect landing of the airplane by the same communications device 24, i.e. via analysis of speed data by the speed determining means 26. The communications device 24 still receives signals from the navigation satellites and based on these signals, it is capable of determining coordinates and measuring speed of movement. Once the measured speed is zero or close to zero, this may indicate that the airplane landed and stopped. All functions of the communications device 24, including transmitting functions, can be restored again automatically by reversing the switching off functionality 28.

Additionally or alternatively, the mapping application 30 can determine the height of the location of the communications device 24 above the earth surface at this particular geographical point. A height of around 2-15 meters typically corresponds to the height of a seat in the airplane on the tarmac. If, at the same time, it is detected that the speed of movement in horizontal direction has become close to zero by the speed determining means 26, a conclusion can be made that the airplane stopped and the functions of the communications device 24 can be activated again.

Additionally, some pause can be maintained between detection that the airplane stopped and activation of all functions of the communications device 24, since the airplane might have stopped on a taxiway but it may continue movement in a minute, for example, in order to reach the parking position.

Additional benefits can be drawn from storage of locations of the airfields in the database accessible by the mapping application 30. With the knowledge of coordinates of the airfields, the communications device 24 can be automatically switched off if detected that the current coordinates correspond to the coordinates of one of the airfields, taxiways or runways stored within a database accessible by the mapping application 30. The communications device 24 can generate a warning to the user, a message or/and a sound, before it is switched off, e.g., via warning generating means similar to warning generating means 18 described above. It is also possible to use a table as shown in FIG. 2, to send a message that the plane has landed to enable people picking up passengers on the plane to leave to meet them at the airport.

Several computer programs resident on transitory or non-transitory computer-readable media may be used in the invention and their function and non-limiting location are mentioned above. In the context of this document, computer-readable media or medium could be any non-transitory means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

Many changes, modifications, variations and other uses and applications of the subject invention will, however, become apparent to those skilled in the art after considering this specification and the accompanying drawing which disclose the preferred embodiments thereof. All such changes, modifications, variations and other uses and applications which do not depart from the spirit and scope of the invention are deemed to be covered by the invention which is limited only by the following claims.

The invention claimed is:

1. A communications device that enables monitoring of presence and movement of a holder of the communications device, comprising:
a speed determining unit that determines a speed of movement of the communications device;
an analysis unit that analyzes the speed of movement of the communications device, as determined by said speed determining unit, relative to a threshold and determines that, when below the threshold, the determined speed of movement of the communications device is indicative of walking of a holder of the communications device and when above the threshold, the determined speed of movement of the communications device is indicative of motorized transport of the holder of the communications device;
a message generator that generates a message based on the determination by said analysis unit, said message generator being configured to select one of a plurality of possible, different messages based on the determined speed of movement of the communications device relative to the threshold; and
a communications unit configured to send the selected message to at least one other communications device from among a plurality of predetermined other communications devices, the at least one other communications device to which the selected message is sent being determined based on the determined speed of movement of the communications device relative to the threshold, such that both the selected message and at least one recipient thereof are determined based on the speed of movement of the communications device, as determined by said speed determining unit, relative to the threshold.

2. The device of claim 1, wherein said speed determining unit comprises a location determining system situated or incorporated into the communications device, analysis of multiple locations determined by said location determining system and time between obtaining of the multiple locations being convertible into speed of movement of the communications device.

3. The device of claim 1, wherein said analysis unit is configured to determine whether the determined speed of movement of the communications device is indicative of walking of the holder of the communications device or indicative of the motorized transport of the holder of the communications device based on comparison of the determined speed of movement of the communications device to one or more thresholds.

4. The device of claim 1, wherein said message generator is configured to select a message to be sent to the at least one other communications device only when the determined speed of movement of the communications device is indicative of the motorized transport of the holder of the communications device.

5. The device of claim 1, further comprising a movement discriminator that considers whether movement of the communications device is indicative of public transportation.

6. The device of claim 5, wherein said communications unit is further configured to send one of the plurality of possible, different messages to the at least one other communications device based on the determined speed of movement of the communications device relative to the threshold and if the movement is indicative of public transportation.

7. The device of claim 1, wherein said message generator includes a table associating different speed conditions to different messages, whereby satisfaction of one of the different speed conditions causes selection of the associated message based on said table.

8. The device of claim 7, wherein said table further includes contact information for the other communications devices to potentially receive the different messages, whereby satisfaction of one of the different speed conditions causes selection of the associated message and retrieval of the contact information for the at least one other communications devices to receive the selected message based on said table.

9. A computer program product resident on non-transitory computer readable medium in a communications device and that enables monitoring of presence and movement of a holder of the communications device, the computer program being configured to: determine a speed of movement of the communications device; and analyze the determined speed of movement of the communications device relative to a threshold; determine that, when below the threshold, the determined speed of movement is indicative of walking of a holder of the communications device and when above the threshold, the determined speed of movement is indicative of motorized transport of the holder of the communications device;

a select one of a plurality of possible, different messages based on the determined speed of movement of the communications device relative to the threshold; and send the selected message to at least one other communications device from among a plurality of predetermined other communications devices, the at least one other communications device to which the selected message is sent being determined based on the determined speed of movement of the communications device relative to the threshold.

10. The computer program product resident on non-transitory computer readable medium of claim 9, wherein the computer program is further configured to determine whether the determined speed of movement of the communications device is indicative of walking of the holder of the communications device or indicative of the motorized transport of the holder of the communications device based on comparison of the determined speed of movement of the communications device to one or more thresholds.

11. The computer program product resident on non-transitory computer readable medium of claim 9, wherein the computer program is further configured to send the selected message to the at least one other communications device only when the determined speed of movement of the communications device is indicative of the motorized transport of the holder of the communications device.

12. The computer program product resident on non-transitory computer readable medium of claim 9, wherein the computer program is further configured to consider whether movement of the communications device is indicative of public transportation, and if so, send one of the plurality of possible, different messages to another communications device based on the determined speed of movement of the communications device relative to the threshold and if the movement is indicative of public transportation.

13. The computer program product resident on non-transitory computer readable medium of claim 9, wherein the computer program is further configured to store a table associating different speed conditions to different messages, whereby satisfaction of one of the different speed conditions causes selection of the associated message based on the table.

14. The computer program product resident on non-transitory computer readable medium of claim 13, wherein the table further includes contact information for the other communications devices to receive the different messages, whereby satisfaction of one of the different speed conditions causes selection of the associated message and retrieval of the contact information for the at least one other communications device to receive the selected message based on the table.

15. A method for monitoring of presence and movement of a holder of the communications device, comprising:

determining a speed of movement of the communications device using a speed determining unit;

analyzing, using an analysis unit, the determined speed of movement of the communications device relative to a threshold and determining that, when below the threshold, the speed of movement of the communications device is indicative of walking of a holder of the communications device and when above the threshold, the speed of movement of the communications device is indicative of motorized transport of the holder of the communications device;

when the determined speed of movement of the communications device is below the threshold, sending one of a first plurality of possible messages having different content to one of a plurality of predetermined communications devices using a message generator and communications unit, and when the determined speed of movement of the communications device is above the threshold, sending one of a second plurality of possible messages having different content than the content of the messages in the first plurality of possible messages to one of a plurality of predetermined communications devices using the message generator and communications unit.

16. The method of claim 15, wherein the step of determining the speed of movement of the communications device using the speed determining unit comprises using a location determining system situated or incorporated into the communications device, and analyzing multiple locations determined by the location determining system and time between obtaining of the multiple locations to derive the speed of movement of the communications device.

17. The method of claim 15, further comprising setting the threshold such that when the determined speed of movement of the communications device is above the threshold, the determined speed of movement of the communications device is indicative of the motorized transport of the holder of the communications device.

18. The method of claim 15, further comprising setting the threshold such that when the determined speed of movement of the communications device is below the threshold, the determined speed of movement of the communications device is indicative of walking of the holder of the communications device.

19. The method of claim 15, further comprising considering whether movement of the communications device is indicative of public transportation, and if movement of the communications device is considered to be indicative of public transportation, sending one of a plurality of possible, different messages to another communications device using the message generator and the communications unit based on the determined speed of movement of the communications device relative to the threshold and if the movement is indicative of public transportation.

20. The method of claim 15, wherein the predetermined communications device to which one of the plurality of possible, different messages is sent when the determined speed of movement of the communications device is below the threshold is different than the predetermined communications device to which one of the plurality of possible, different messages is sent when the determined speed of movement of the communications device is above the threshold.

* * * * *

UNITED STATES PATENT AND TRADEMARK OFFICE
CERTIFICATE OF CORRECTION

PATENT NO. : 9,277,355 B1
APPLICATION NO. : 14/245438
DATED : March 1, 2016
INVENTOR(S) : Philip Rosenbach Page 1 of 1

It is certified that error appears in the above-identified patent and that said Letters Patent is hereby corrected as shown below:

Claims

Column 11, claim 9, line 5, before "select", delete "a".

Signed and Sealed this
Third Day of May, 2016

Michelle K. Lee
*Director of the United States Patent and Trademark Office*